United States Patent [19]

Nishibe et al.

[11] Patent Number: 4,956,546

[45] Date of Patent: Sep. 11, 1990

[54] METHOD AND APPARATUS FOR ALIGNING IMAGE SENSORS WITH AN OPTICAL SYSTEM IN AN OPTICAL APPARATUS

[75] Inventors: Takashi Nishibe; Shotaro Yokoyama, both of Kanagawa, Japan

[73] Assignee: Fuji Electric Co., Ltd., Kanagawa, Japan

[21] Appl. No.: 376,514

[22] Filed: Jul. 7, 1989

[30] Foreign Application Priority Data

Aug. 4, 1988 [JP] Japan .................................. 63-194910

[51] Int. Cl.$^5$ ................................................ G01J 1/20
[52] U.S. Cl. ................................... 250/203.1; 356/152
[58] Field of Search .................. 250/216, 203.3, 203.1; 356/141, 152, 399, 400

[56] References Cited

U.S. PATENT DOCUMENTS 4,694,150 9/1987 Schulz-Hennig et al. ........ 250/203.1
4,867,560 9/1989 Kunitsugu ............................ 356/152

Primary Examiner—David C. Nelms
Attorney, Agent, or Firm—Finnegan, Henderson, Farabow, Garrett, and Dunner

[57] ABSTRACT

A method and apparatus for aligning image sensors with an optical system in an optical apparatus utilizing photosensors incorporated in the image sensors with high precision. The reference light beams are focused on the image sensors each having a specified photosensor for receiving a respective light beam. Signal outputs from the specified photosensors of the image sensors are measured. The position of the image sensors is adjusted relative to the position of the optical system in response to the measured signal outputs.

11 Claims, 1 Drawing Sheet

METHOD AND APPARATUS FOR ALIGNING IMAGE SENSORS WITH AN OPTICAL SYSTEM IN AN OPTICAL APPARATUS

BACKGROUND OF THE INVENTION

1. Field of the Invention

The present invention relates to a method and apparatus for aligning image sensors with an optical system in an optical apparatus such as camera that employs image sensors for automatic focusing.

2. Description of the Related Art

The operating principle of automatic focusing in an optical apparatus such as camera is well known An optical system in the optical apparatus focuses an image of an object individually on linear image sensors. Each image sensor generates a respective set of visual data and these sets of visual data from the image sensors are compared with one another for detecting a value corresponding to the relative position or distance of the object with respect to the optical apparatus. Based on deviation of the detected value from a reference value, the distance of the object or the extent and direction of deviation of the object from a focal point of the optical system is determined.

The linear image sensors are typically constructed with charge-coupled devices (CCDs) or photodiode arrays. Usually a pair of linear image sensors are incorporated into a semiconductor integrated circuit chip. The physical arrangement of the pair of linear image sensors in the semiconductor chip largely depends on the arrangement of the optical system. The optical system focuses an image corresponding to an object on each of the pair of image sensors Typically, the pair of image sensors are disposed apart from each other longitudinally in a row in the semiconductor chip.

Regardless of whether the optical system is incorporated in or separated from the optical apparatus, the optical system usually includes a pair of imaging means or small lenses for receiving the image from the object. The optical system then focuses the image on each of the image sensors in a semiconductor device. The semiconductor device is positioned close to the focal point of the imaging means.

The optical system is usually assembled as an optical module into the optical apparatus, and high precision is required to mechanically couple the optical system or module to the pair of linear image sensors in the semiconductor device. There are several positional variables that have to be precisely controlled to attain such high precision mechanical coupling, in reference to the semiconductor chip: x and y-directions parallel to a planar surface of the semiconductor chip, a z-direction normal to the planar surface, and a direction of tilting angle $\theta$ around z-axis. In practice, the precision required in the z-direction does not pose a significant problem. However, the precision required in the x- and y-directions, poses the most significant problem, and in $\theta$ the next most significant problem.

To resolve these problems, an object or marker having a distinct pattern is placed at a specified distance from the optical system. The optical system receives an image of the object and produces the image on each of the pair of image sensors. A value corresponding to the distance of the object from the optical system or deviation from a focal point of the optical system is detected based on visual data obtained from each of the image sensors. In response to the detection, the semiconductor device is accordingly moved by small increments for alignment with the optical system until it reaches a point where the detected value coincides with a reference corresponding to the position of the object, and the semiconductor device is fixed securely at that point to the optical system.

The prior art method described above is probably one of the most reliable approaches conceivable since it provides a precision alignment on the basis of the result of the detection, which is an object of using the image sensors. This method, however, has a serious drawback in that the alignment precision obtained in this manner is not high enough for certain applications. In order to further increase alignment precision, the result of the detection or the detected value has to change significantly with a small change in the positional relation between the image sensors and the optical system. Conventionally, alignment precision can be obtained to the order of one unit, which is equivalent to a pitch between two adjacent photosensors in each image sensor.

Alignment precision on the order of one unit may be sufficient in many applications. However, in situation where the result of detection is obtained every fraction or less of an unit, alignment between the image sensors and the optical system must improve by at least an order of magnitude (i.e., to one tenth of the order of one unit). To satisfy this need, it has been attempted to substitute the visual data obtained from the image sensors for the result of the detection and to improve alignment precision by applying interpolation to the visual data. It has been proven, however, that this technique is still insufficient to improve precision to the order of one tenth of a unit. This would be partly because the visual data can only be obtained via photosensors and partly because the image produced on each image sensor may be slightly blurred.

SUMMARY OF THE INVENTION

An object of the present invention is to improve alignment precision between image sensors and an optical system.

A further object of the present invention is a method for aligning image sensors and an optical system that has an accuracy of less than the pitch of photosensors in the image sensors.

Yet another object of the present invention is an apparatus for aligning image sensors and an optical system wherein the alignment accuracy is a fraction of the pitch of photosensors in the image sensors.

These and other objects of the present invention are accomplished by a method of aligning a plurality of image sensors with an optical system in an optical apparatus, each of the plurality of image sensors being spaced apart from the other image sensors and having at least one photosensor for receiving light, comprising the steps of generating an alignment light beam from a light source disposed adjacent the optical system splitting the alignment light beam into a plurality of reference light beams, each of the reference light beams corresponding to a different one of the plurality of image sensors, focusing each of the reference light beams on a specified one of the at least one photosensors in the corresponding one of the image sensors such that the cross-sectional size of each of the plurality of reference light beams is substantially equal in size to a size of the corresponding specified photosensor so that a maximum amount of light is received by each of the specified photosensors at times when the plurality of image sensors are aligned with the optical system, measuring the amount of light received by the specified photosensors, and moving the position of the plurality of image sensors relative to the optical system for alignment in response to the measured amount of light received by the specified photosensors until the measured amount of light reaches a maximum.

The above and other objects of the present invention are also accomplished by an apparatus for aligning a plurality of image sensors with an optical system in an optical apparatus, wherein each of the plurality of image sensors is spaced apart from the other image sensors and has at least one photosensor for receiving light, comprising a light source disposed adjacent the optical system, means for generating an alignment light beam from the light source, means for splitting the alignment light beam into a plurality of reference light beams, each of the reference light beams corresponding to a different one of the plurality of image sensors, means for focusing each of the reference light beams on a specified one of the at least one photosensors in the corresponding one of the image sensors such that the cross-sectional size of each of the plurality of reference light beams is substantially equal in size to a size of the corresponding specified photosensor so that a maximum amount of light is received by each of the specified photosensors at times when the plurality of image sensors are aligned with the optical system, means for measuring the amount of light received by the specified photosensors, and means for moving the position of the plurality of image sensors relative to the optical system for alignment in response to the measured amount of light received by the specified photosensors until the measured amount of light reaches a maximum.

BRIEF DESCRIPTION OF THE DRAWINGS

The manner by which the above objects, and other objects, features, and advantages of the present are attained will be fully apparent to one of ordinary skill in the art from the following detailed description when it is considered in view of the drawings, wherein.

DESCRIPTION OF THE PREFERRED EMBODIMENT

According to an embodiment of the present invention, a pair of linear image sensors each having a plurality of photosensors are integrated in a semiconductor integrated circuit chip. The pair of image sensors are disposed apart from one another longitudinally in the chip. An optical system having a pair of imaging means such as small lenses receives a light beam from an object, splits the light beam into two individual beams, and focuses each individual light beam on a corresponding one of the pair of linear image sensors. The semiconductor chip having the pair of linear image sensors is aligned with the optical system in parallel with a planar surface of the semiconductor chip.

More specifically, two separate reference light beams are individually directed to the two imaging means in the optical system via two corresponding diaphragm stops. Each diaphragm stop has an aperture. Each imaging means focuses a respective individual reference light beam on a specified one of the photosensors in a corresponding image sensor. The specified photosensor provides a signal output corresponding to the amount of light received. The aperture in the diaphragm stop is adjusted so that the spot size of the reference light beam produced on each image sensor corresponds to the size of the specified photosensor. The signal outputs of the specific photosensors are measured, and the position of the semiconductor chip is adjusted with respect to the optical system in accordance with the measured signal outputs so that the signal outputs correspond to a maximum quantity of light that can be received by the specified photosensors.

In practice, the reference light beam is rendered equivalent to a light beam that can be received from an object located from the optical system at an infinite distance.

Reference will now be made in detail to the present preferred embodiment of the present invention, an example of which is illustrated in the accompanying drawing.

Figure 1:
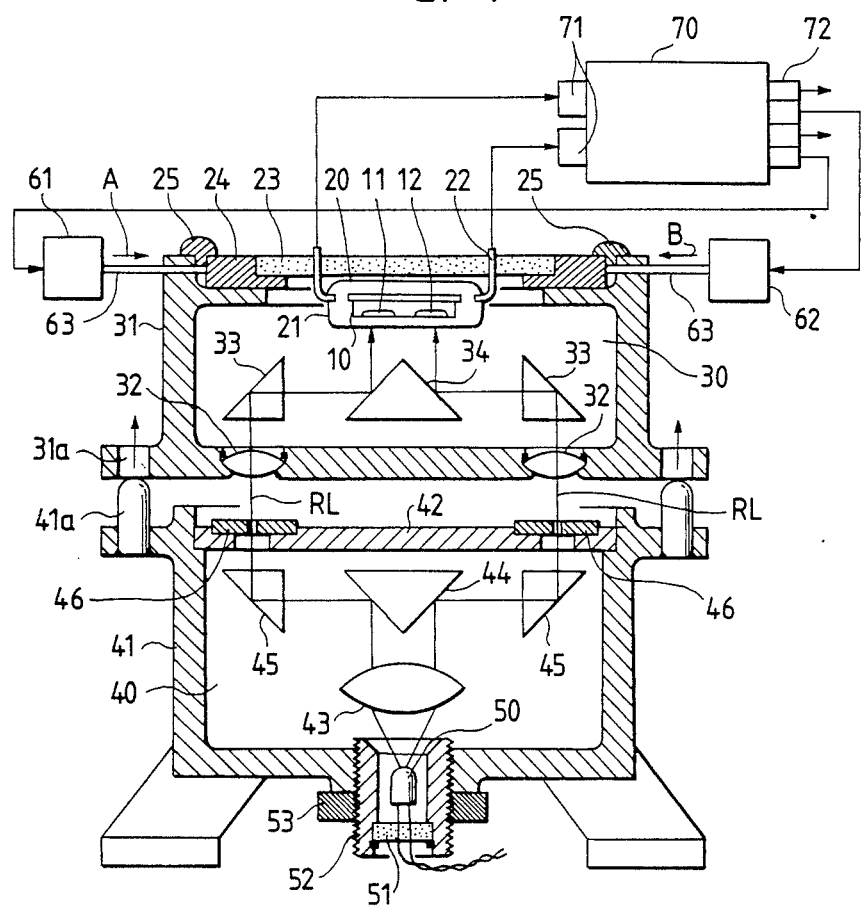
FIG. 1 shows a cross sectional view of an embodiment of the present invention, including a pair of image sensors, an optical system and a reference light projecting unit.
Figure 2:
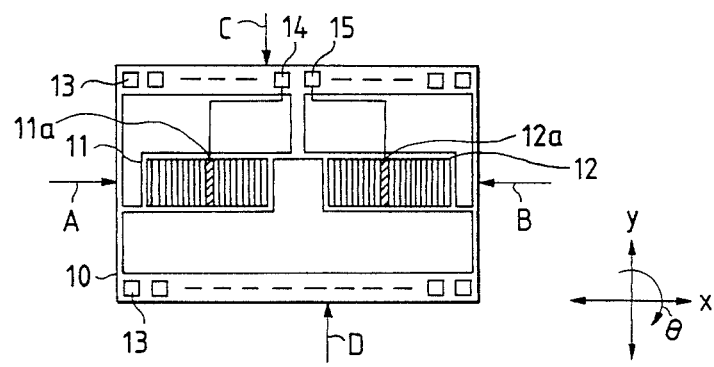
FIG. 2 is a plan view of a semiconductor chip employed in the image sensors of FIG. 1.

In FIG. 1, a semiconductor device 20 includes a semiconductor integrated circuit chip 10. A semiconductor package 21 has a bottom portion which is transparent and disposed adjacent a pair of linear image sensors 11 and 12. Leads 22 extend from the semiconductor chip 10 for electrical connection to the outside. Semiconductor device 20 is mounted on an electrically insulating substrate 23, which is fixedly attached to a retaining member 24. Image sensors 11 and 12 each comprise an array of photosensors and are integrated into semiconductor chip 10 and disposed apart from one another longitudinally in a row as shown in FIG. 2.

Optical system 30 has a case 31 to house optical components to form an optical module The optical module is adapted for detecting the distance of an object from the optical system 30. A top surface of the case 31 adjacent semiconductor device 20 movably secures retaining member 24 which supports semiconductor device 20.

Each of a pair of small lenses or imaging means 32 focuses an image of an object on a corresponding one of image sensors 11 and 12. Imaging means 32 are disposed on a bottom surface of the case 31 opposite the top surface, and apart from one another at a distance necessary to detect the distance of the object trigonometrically. Imaging means 32 receive an image from an object and focuses the image when the optical module is attached to an optical apparatus such as a camera.

According to the preferred embodiment of the present invention, imaging means 32 receive two parallel reference light beams RL. A pair of prisms 33 and a reflecting mirror 34 guide received reference beams RL to image sensors 11 and 12.

As shown in FIG. 1, a reference light projecting unit 40 generates reference light beams RL. Optical system 30 is securely attached to reference light projecting unit 40 with precision by mating male pins 41a on an upper face 42 of a case 41 of projecting unit 40 with corresponding female holes 31a in case 31 of optical system 30.

A light-emitting diode 50 provides a light source for reference light beams RL. Light-emitting diode 50 is housed in a tubular retaining case 52, and an electrically insulating board 51 is inserted into retaining case 52 for closing an open end of case 52. Case 52 is threaded into case 41. By tightening a nut 53 around case 52, light-emitting diode 50 is secured to a bottom side opposite the upper side of case 41 so that an active portion of diode 50 is positioned at a focal point of a lens 43 disposed adjacent diode 50.

Infrared lights from light-emitting diode 50 are collimated with lens 43 and split into two parallel reference light beams RL by a reflecting mirror 44 each directed by a respective one of a pair of prisms 45. The spot size of reference beams RL is adjusted by diaphragm stops 46 attached to cover 42 of case 41. Reference beams RL are then directed to imaging means 32 in optical system 30. Thus, these two parallel reference beams RL generated above are rendered equivalent to light beams received from an object at infinity.

When image sensors 11 and 12 are aligned with optical system 30, reference light beams RL are received by specified photosensors 11a and 12a in image sensors 11 and 12, respectively, as shown in FIG. 2. Each of photosensors 11a and 12a is elongated with a width of 10–20 μm and a length of several tens of microns being greater the width, as shown in FIG. 2. The aperture of each diaphragm stop 46 in reference light projecting unit 40 is adjusted so that when reference beams RL are focused on image sensors 11 and 12, the spot size of each of the reference beams RL corresponds to the size of a corresponding one of photosensors 11a and 12a. Ideally, the spot size of reference beams RL is equal to the size of photosensors 11a and 12a in both width and length. In practice, however, since the photosensors are elongated as shown in FIG. 2, the spot size is substantially equal only to the width of the photosensors. This offers an advantage that a simple slit configuration will suffice for each diaphragm stop 46.

Reference light beams RL are directed to the imaging means 32. Each reference beam has a small cross section so that each beam will strike only a central portion of a respective imaging means. Therefore, for imaging means 32, low precision lenses such as molded plastic lenses will suffice since reference light beams RL will still be focused on the image sensors with a negligible degree of blurring.

In FIG. 2, a plurality of connecting pads 13 are arranged in a row on each of two sides of semiconductor chip 10. Two connecting pads 14 and 15 are connected to photosensors 11a and 12a, respectively, for receiving reference beams RL. Photosensors 11a and 12a provide signal outputs corresponding to the quantity of light received thereby from reference light beams RL to connecting pads 14 and 15 and then to leads 22. In order to increase alignment precision, the signal outputs are preferably in an analog form.

The position of semiconductor device 20 having image sensors 11 and 12 are adjusted in directions x, y and θ as shown in FIG. 2 with respect to optical system 30 in response to the signal outputs. These directions are parallel to a planar surface of semiconductor chip 10 or semiconductor device 20. The position of semiconductor device 20 or accordingly that of image sensors 11 and 12 is adjusted with small electromagnetic manipulators 61 and 62 having rods 63 shown in FIG. 1. Each rod 63 pushes a respective lateral side of retaining member 24 to which semiconductor device 20 is secured. The direction in which rods 63 are pushed is indicated by A and B in FIG. 1, but in practice, semiconductor device 20 is manipulated in at least four directions, A, B, C, and D, as shown in FIG. 2.

The adjusting operation is proceeded as follows: the signal outputs supplied from photosensors 11a and 12a are displayed on an instrument and electromagnetic manipulators 61, 62 and corresponding pushing rods 63 are simultaneously manipulated by a joystick (not shown) for adjusting the position of retaining member 24 until a maximum quantity of light is received by photosensors 11a and 12a.

To increase operating efficiency, automatic adjustment is obtained using a microcomputer 70 and other associated devices shown in FIG. 1. For automatic adjustment, analog signal outputs from photosensors 11a and 12a are converted to digital signals by A/D converters 71, which are then fed into microcomputer 70. Microcomputer 70 in turn generates operating commands to electromagnetic manipulators 61 and 62 via D/A converters 72. Converters 71 and 72, A/D converters 71 in particular, are preferably of high-precision having a capacity of 8–12 bits. When the adjusting operation is complete, retaining member 24 is fixed securely to case 31 of optical system 30 by suitable means such as an adhesive 25.

In the embodiment of the present invention, the spot size of reference light beams RL is adjusted to be substantially equal to the size, the width in particular, of the photosensor in each image sensor. The signal outputs from the photosensor corresponding to the light quantity received thereby become highly sensitive to a deviation of the reference beams impinging on the photosensors from the position of the photosensors. Therefore, in response to the signal outputs, alignment between the image sensors and the optical system are made in x-direction (i.e., the direction of the width of the photosensors) to a precision which is equivalent to one-tenth of the pitch between the photosensors. X-direction is the most important in practice for attaining high adjustment precision.

It will be apparent to those skilled in the art that various modifications and variations can be made to the embodiment of the present invention and in construction of this embodiment without departing from the scope and spirit of the invention. For example, in the embodiment of the present invention, the optical system is adapted for detecting a distance of an object of interest from the optical system. However, the basic idea of receiving light from an object through a pair of imaging means can be applied to a situation where the optical system is adapted for detecting a deviation from a focal point of the optical system. The scope of the present invention can be equally applied in this situation.

In the embodiment of the present invention, two parallel reference light beams are rendered equivalent to light beams from an object at infinity. However, depending on the construction of the optical apparatus, the reference light beams that are rendered equivalent to light beams from an object at a finite distance can be employed as well for attaining alignment between the image sensors and the optical system.

There are several advantages of the present invention over the prior art.

In the prior art, the alignment of the image sensors with the optical system has been accomplished by using the result of a detection of a distance of an object or deviation from a focal point. The result is obtained from visual data provided by a pair of image sensors. However, it is difficult to achieve high alignment precision so long as an entire set of visual data, which can only be obtained with photosensors, is used as a basis of detection.

In the embodiment of the present invention, however, only a single piece of data which is obtained from a specified photosensor in each image sensor is used. The relative position of the semiconductor device incorporating the image sensors is adjusted with respect to the position of the optical system so that a maximum quantity of a reference light (i.e., a single piece of visual data) is received by the photosensor in each of the image sensors. By doing this, alignment precision is improved by at least one order of magnitude over what has been possible in the prior art.

The present invention is particularly effective in assembling an automatic focusing device in a camera. It enhances reliability by improving alignment precision between the image sensors and optical system in the device. Furthermore, if interpolation or some other suitable method is adopted, focus can be finely adjusted with a precision which is smaller than the pitch between the adjacent photosensors in the image sensor, thereby further enhancing autofocusing capabilities.

What is claimed is:

1. A method of aligning a plurality of image sensors with an optical system in an optical apparatus, each of the plurality of image sensors being spaced apart from the other image sensors and having at least one photosensor for receiving light, comprising the steps of:

generating an alignment light beam from a light source disposed adjacent the optical system;

splitting the alignment light beam into a plurality of reference light beams, each of the reference light beams corresponding to a different one of the plurality of image sensors;

focusing each of the reference light beams on a specified one of the at least one photosensors in the corresponding one of the image sensors such that the cross-sectional size of each of the plurality of reference light beams is substantially equal in size to size of the corresponding specified photosensor so that a maximum amount of light is received by each of the specified photosensors at times when the plurality of image sensors are aligned with the optical system;

measuring the amount of light received by the specified photosensors; and moving the position of the plurality of image sensors relative to the optical system for alignment in response to said measured amount of light received by the specified photosensors until said measured amount of light reaches a maximum.

2. The method of claim 1, wherein the step of focusing includes the substep of providing adjusting diaphragms adjacent the optical system to shape the reference light beams to correspond to the shape of the photosensors.

3. The method of claim 1, wherein the step of measuring includes the substep of generating a signal output in response to the amount of light received by each photosensor.

4. The method of claim 3, wherein the step of moving includes the substep of manipulating the position of the plurality of image sensors relative to the optical system in response to the generated signal output.

5. The method of claim 4, wherein the substep of manipulating includes the further substep of moving the position of the plurality of image sensors in parallel with a planar surface of the optical system in at least one direction.

6. The method of claim 4, wherein the substep of manipulating includes the further substep of moving the position of the plurality of image sensors in parallel with a planar surface of the optical system in four directions.

7. An apparatus for aligning a plurality of image sensors with an optical system in an optical apparatus, wherein each of the plurality of image sensors is spaced apart from the other image sensors and has at least one photosensor for receiving light, comprising:

a light source disposed adjacent the optical system;

means for generating an alignment light beam from said light source;

means for splitting the alignment light beam into a plurality of reference light beams, each of the reference light beams corresponding to a different one of the plurality of image sensors;

means for focusing each of the reference light beams on a specified one of the at least one photosensors in the corresponding one of the image sensors such that the cross-sectional size of each of the plurality of reference light beams is substantially equal in size to a size of the corresponding specified photosensor so that a maximum amount of light is received by each of the specified photosensors at times when the plurality of image sensors are aligned with the optical system;

means for measuring the amount of light received by the specified photosensors; and means for moving the position of the plurality of image sensors relative to the optical system for alignment in response to said measured amount of light received by the specified photosensors until said measured amount of light reaches a maximum.

8. The apparatus of claim 7, wherein the photosensors are of a rectangular shape defined by width and length dimensions, the width dimension being equal to or less than the length dimension, and said cross-sectional size of each of the plurality of reference light beams is defined by a radius that is substantially equal to said width dimension.

9. The apparatus of claim 7, wherein the plurality of image sensors are integrated in a single device.

10. The apparatus of claim 7, wherein the plurality of image sensors are a pair of image sensors integrated in a semiconductor integrated circuit device.

11. The apparatus of claim 7, wherein said focusing means includes a plurality of adjusting diaphragms adjacent the optical system, each of said adjusting diaphragms being associated with a different one of said reference light beams for shaping said associated reference light beam to correspond to the shape of the photosensors.

* * * * *